United States Patent [19]
Hodac et al.

[11] Patent Number: 5,775,725
[45] Date of Patent: Jul. 7, 1998

[54] DEVICE FOR FASTENING AN AIR BAG HOUSING COMPRISING A HOUSING BOTTOM AND A HOUSING COVER IN THE STEERING WHEEL

[75] Inventors: Hung Hodac, Niedernberg; Karl Hussy, Waldaschaff, both of Germany

[73] Assignee: Petri AG, Aschaffenburg, Germany

[21] Appl. No.: 727,550

[22] PCT Filed: Feb. 3, 1996

[86] PCT No.: PCT/EP96/00543

§ 371 Date: Oct. 2, 1996

§ 102(e) Date: Oct. 2, 1996

[87] PCT Pub. No.: WO96/24511

PCT Pub. Date: Aug. 15, 1996

[30] Foreign Application Priority Data

Feb. 6, 1995 [DE] Germany ............ 195 03 816.9

[51] Int. Cl.$^6$ .................. B60R 21/16; F16B 21/00
[52] U.S. Cl. ............... 280/728.2; 280/731; 411/348
[58] Field of Search ................ 280/728.2, 731; 200/61.55; 411/348

[56] References Cited

U.S. PATENT DOCUMENTS

| | | |
|---|---|---|
| 3,793,685 | 2/1974 | Knecht ................. 24/651 |
| 5,087,069 | 2/1992 | Corbett et al. ................. 280/731 |
| 5,207,544 | 5/1993 | Yamamoto et al. ................. 280/728.2 |
| 5,333,897 | 8/1994 | Landis et al. ................. 280/731 |
| 5,350,190 | 9/1994 | Szigethy ................. 280/731 |
| 5,380,037 | 1/1995 | Worrell et al. ................. 200/61.55 |
| 5,470,099 | 11/1995 | Williams ................. 280/728.2 |

*Primary Examiner*—Paul N. Dickson
*Attorney, Agent, or Firm*—McGlew & Tuttle

[57] ABSTRACT

Device for fastening an air bag housing including a housing bottom and a housing cover in the steering wheel. Hooks extending in parallel to the central axis of the steering wheel are arranged at the bottom of the housing, and a matching number of pretensioned leg springs are arranged on the skeleton of the steering wheel, with one of their legs being firmly clamped in a bracket releasing a guide window for the hook such that the free leg of the spring is located in the area of the guide window and consequently in the path of insertion of the hook. At least two pins having a circular groove are fastened to the skeleton of the steering wheel, and a matching number of middle sleeves are fastened to the bottom of the housing, and the middle sleeves are used as a guide for an inner sleeve and for an outer sleeve, and the outer sleeve has dome-shaped recesses arranged on a circumferential line, wherein the middle sleeve has holes acting as a ball cage for balls having a diameter exceeding the wall thickness of the sleeve in a circumferential position corresponding to the dome-shaped recesses, and the inner and outer sleeves are provided with stops.

6 Claims, 6 Drawing Sheets

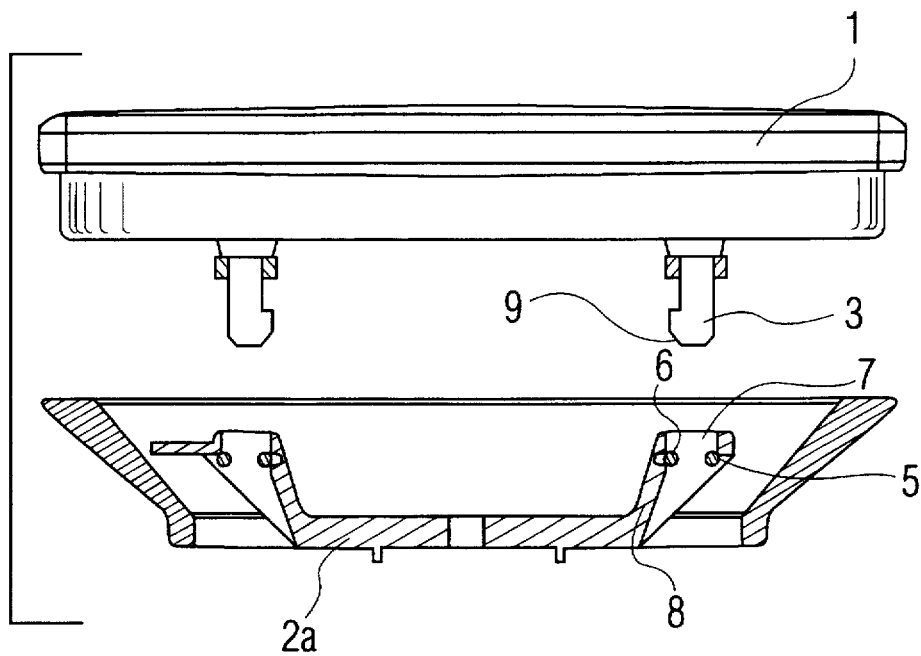
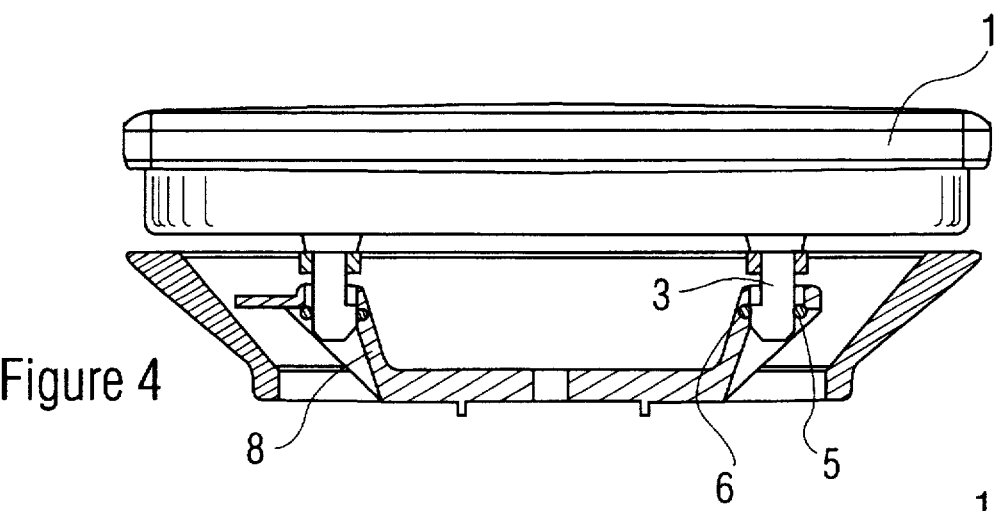
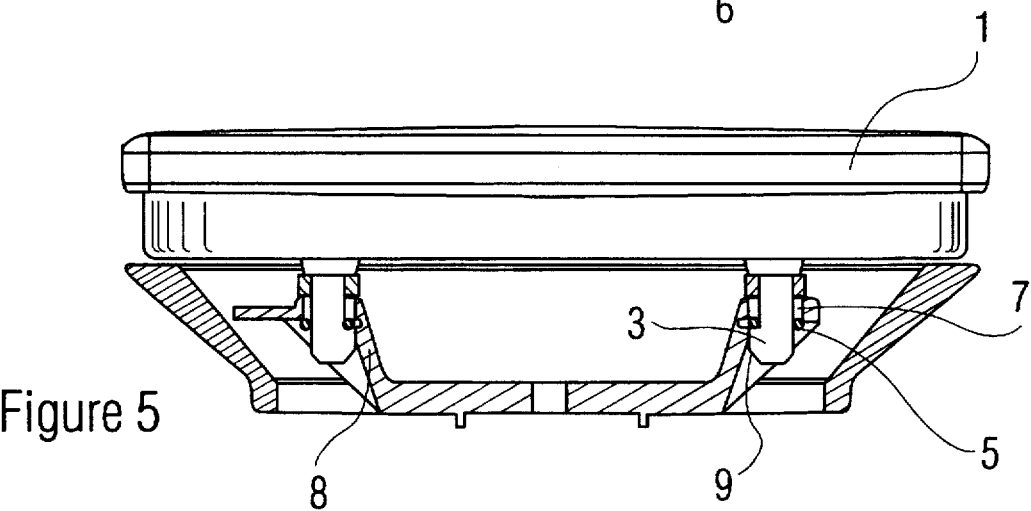

DEVICE FOR FASTENING AN AIR BAG HOUSING COMPRISING A HOUSING BOTTOM AND A HOUSING COVER IN THE STEERING WHEEL

FIELD OF THE INVENTION

The present invention relates to a method and device for connecting the housing of an air bag to the dish or skeleton of a steering wheel in an automobile. More particularly, the present invention relates to a snap or spring latch device where the air bag and the steering wheel dish have connectors which snap together.

BACKGROUND OF THE INVENTION

The driver-side air bag arranged in the steering wheel dish is conventionally fastened by screwing the module, i.e., essentially the air bag housing, against the steering wheel skeleton, wherein it must be ensured for design reasons that the fastening means are not recognized from the outside after mounting. Since the air bag module can be introduced into the steering wheel dish only after mounting of the steering wheel for technical reasons, a considerable amount of mounting is involved. If the screwing of the air bag is performed from the side, the screwing means remain visible and must be provided with a cover for covering. The screwing is therefore performed from the bottom, which is generally also linked with difficulties in view of the fact that the fastening points are poorly accessible and this makes it necessary to rotate the steering wheel after fastening the first screw in order to gain access to the fastening point of the second screw.

SUMMARY AND OBJECTS OF THE INVENTION

The basic object of the present invention is to provide a device by means of which the air bag module can be fastened in the steering wheel dish in a simple and readily re-detachable manner.

The present invention provides a fastening device, by means of which the air bag module can be anchored in the steering wheel dish on anchors invisible from the outside without the use of a tool, wherein removal after fastening is not possible or is possible with a major effort only, so that an unintended or willful removal of the air bag is ruled out.

The present invention includes a locking member mounted on one of the air bag housing or the steering wheel dish. A spring tension catch means is mounted on the other of the air bag housing or the steering wheel dish. The spring tension catch means receives the locking members and engages with the locking members when the locking members is inserted into the spring tension catch means. The spring tension catch means and the locking member then support the air bag housing in the steering wheel dish.

In one embodiment the locking member is a hook and the spring tension catch means is a bracket. The bracket defines a window and the hook is inserted into the window. Also in the bracket is a leg spring which has first and second rights. The first leg is firmly held in the bracket while the second leg is movable in the window and in the path of the hook when the hook is inserted through the window. When the hook is inserted through the window, the second leg is moved by the hook. The leg spring biases the second leg so that the second leg moves into the detent of the hook once the hook has moved into the window. The hook, bracket and spring are formed so that all three of these structures securely hold the air bag to the steering wheel dish.

In another embodiment, a pin is provided on the steering wheel dish. The pin is the locking member which has a circumferential groove. The air bag housing has a sleeve which fits over the pin. The sleeve also defines holes in an area corresponding to the groove and the pin when the air bag is properly positioned in the steering wheel dish. The holes in the sleeve are formed as a ball bearing cage. An outer sleeve is guided on the inner sleeve and biased into a stop position. When the outer sleeve is in the stop position, ball bearings in the holes in the middle sleeve are forced radially inward. When the middle sleeve is mounted on the pin, the balls are forced into the groove on the pin and the middle sleeve and the air bag housing is locked onto the pin.

The size of the groove, the size of the balls and the size of the wall thickness of the middle sleeve are formed so that there is axial play. A signal device is incorporated in the connection between the air bag and the steering wheel dish. The signal device has a set of contacts which touch and separate to generate a signal, usually from the horn of the automobile. The axial play formed by the size of the groove and the balls allows these contacts to make and break an electrical connection.

In the second embodiment, an inner sleeve is also provided with a spring biasing the inner sleeve in a stopped position. When the inner spring is in the stop position, the balls are biased radially outwards. The outer sleeve has ball recesses which allow the balls to move radially outward. When the middle sleeve is positioned on the pin, movement of the middle sleeve onto the pin pushes the inner sleeve away from the balls and the balls then slide on the pin until they move into the groove on the pin.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a side view of the air bag module together with a partial sectional view of the steering wheel prior to mounting;

FIG. 4 is a view corresponding to FIG. 3 in an intermediate mounting position;

FIG. 5 is a view corresponding to FIGS. 3 and 4 after the mounting of the air bag module in the steering wheel dish;

DETAILED DESCRIPTION OF THE PREFERRED EMBODIMENT

Figure 1A:
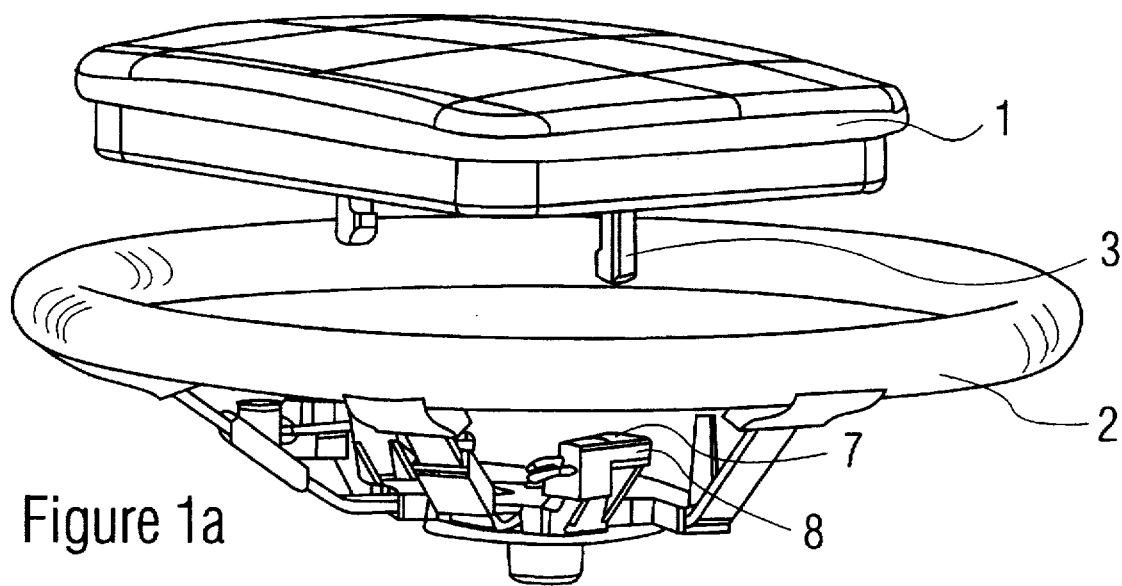
FIG. 1A is a perspective view of a steering wheel with air bag before it is fastened in the steering wheel dish.
Figure 1B:
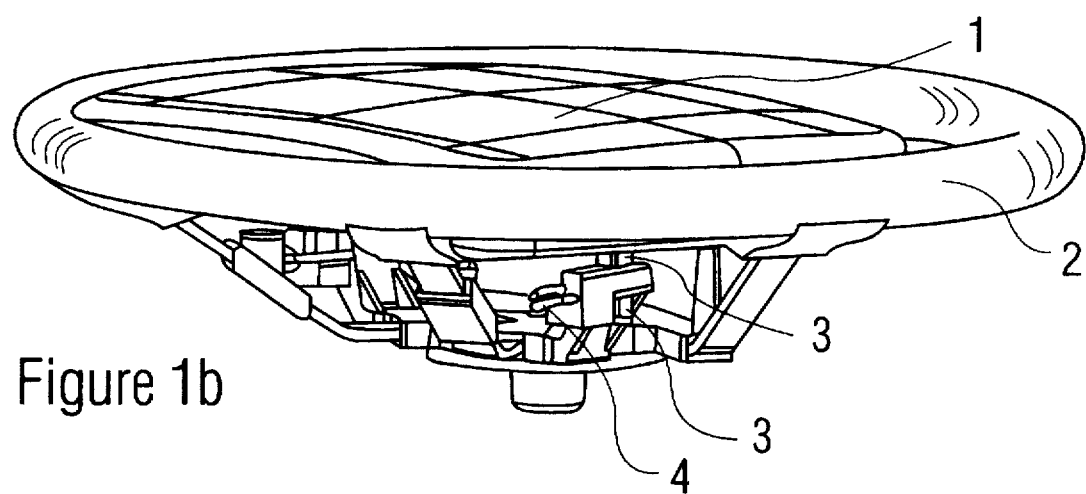
FIG. 1B is the steering wheel shown in FIG. 1A after introduction of the air bag.
Figure 2:
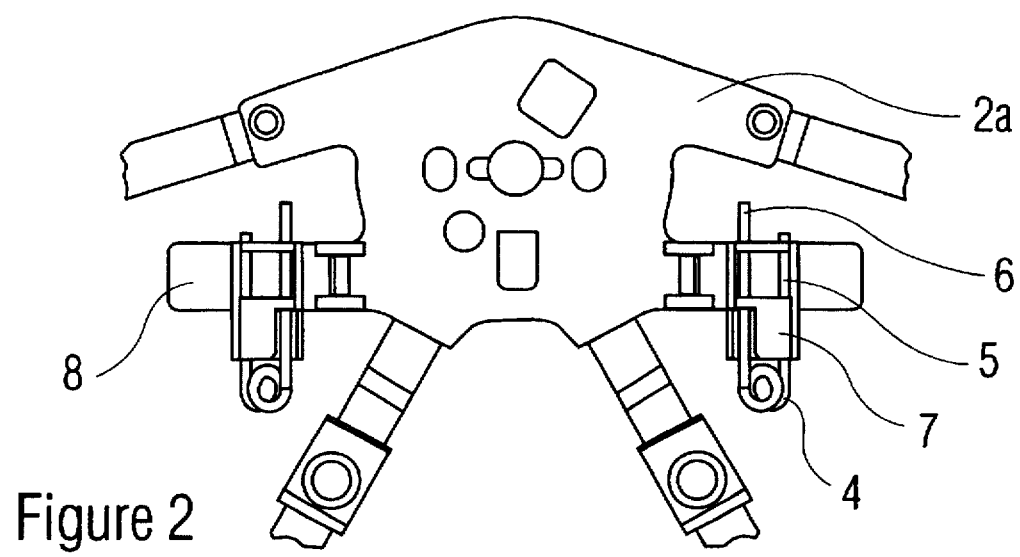
FIG. 2 is a top view of the skeleton of the steering wheel in the area of the steering wheel hub.
Figure 6B:
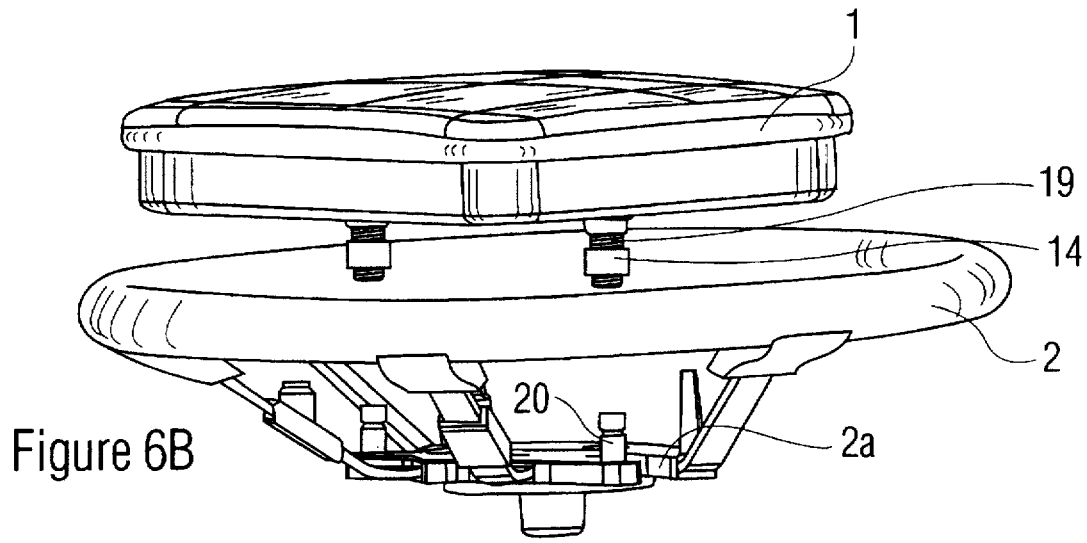
FIGS. 6A and 6B show the perspective view of a steering wheel with air bag in another embodiment before the fastening of the air bag in the steering wheel dish.
Figure 6A:
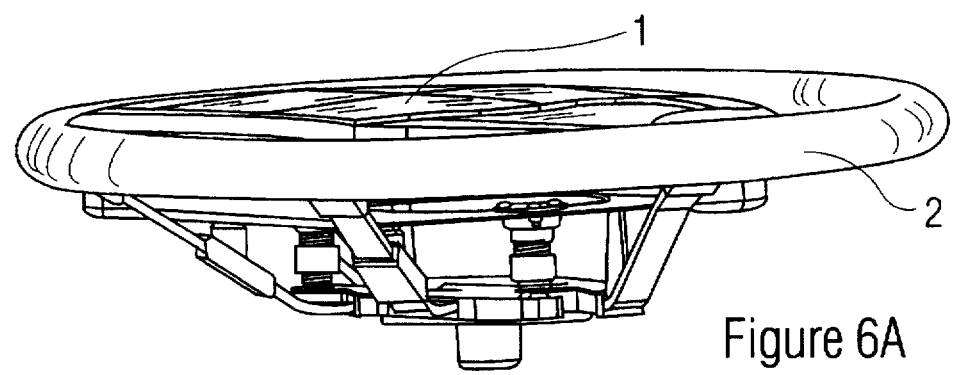
Figure 8:
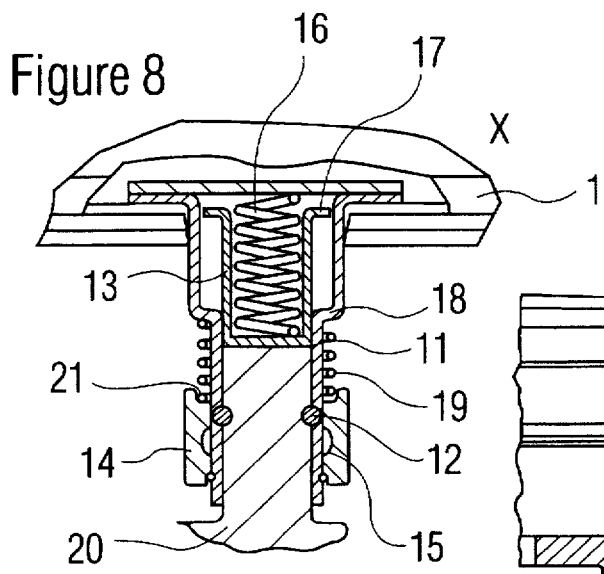
FIG. 8 is an enlarged detail of one of the fastening points.
Figure 7:
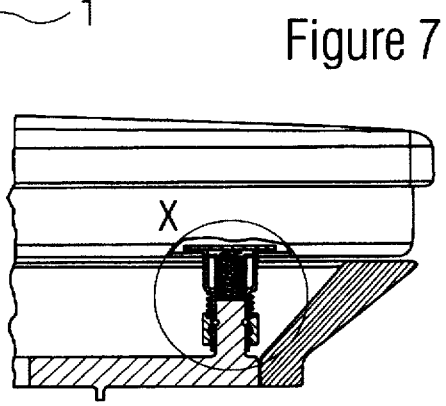
FIG. 7 is an enlarged detail of the steering wheel after the mounting of the air bag in the area of the fastening points.

The device shown in the drawings is used to fasten the housing 1 in the dish of the steering wheel 2, wherein a bracket is arranged at the bottom of the housing 1 and a spring-tensioned catch 4, 5, 6 cooperating with the bracket is arranged on the skeleton of the steering wheel in the embodiment shown in FIGS. 1 through 5. The brackets arranged at the bottom of the housing 1 comprise locking members in the form of two hooks 3 extending in parallel to the central axis of the steering wheel. The spring-tensioned catches comprise two pretensioned leg springs 4 arranged in a corresponding area of the steering wheel skeleton, which are tensioned with one leg 5 in a bracket 8 forming a guide window 7 for the hook 3 such that the free leg acting with a force directed radially to the outside is located in the area of the guide window 7 and consequently in the path of insertion of the hook 3. The free leg 6 now extends beyond the bracket 8 and into a space accessible from the outside in the radial direction, so that the projecting end is freely accessible and is pressed inwardly there for the purpose of removing the air bag module, and the hook 3 can thus be pulled out of the bracket.

For mounting (see FIGS. 3 through 5), the air bag with its hook 3 is placed over the window 7 (FIG. 3), and is pushed into the window (FIG. 4), while the leg 6 of the leg spring 4 slides up on the oblique edge 9 of the hook 3 until it snaps in behind the detent after it has been pushed in completely due to being pretensioned. The air bag is thus firmly clipped in the steering wheel dish and can no longer be readily removed. Removal requires the simultaneous loosening of both springs, which makes it necessary to press both spring legs 6 out of the area of the detent by means of a tool.

In the embodiment shown in FIGS. 6 through 12, the locking members are two pins 20 having a circular groove 21 and fastened to the skeleton of the steering wheel hub. The spring tensioned catch, or catches, are matching number of middle sleeves 11, which can be attached to the pins and are provided with a tapering 18 forming a shoulder both on the inside and on the outside, are fastened to the bottom of the housing 1. The sleeve is used as a guide for two other sleeves, namely, an inner sleeve 13 and an outer sleeve 14. The inner sleeve 13 is designed as a pot-shaped sleeve with a bottom to form a spring support. A spring 16 supported on the air bag housing 1 or on a spring plate 25 acts on the inner sleeve 13. A spring 19 supported on the shoulder 18 acts on the sleeve 14, which is likewise guided on the tapered part of the sleeve 11. Furthermore, the outer sleeve 14 is provided with dome shaped recesses arranged on a circumferential line acting as ball sockets 15. The middle sleeve 11 is provided with holes, which are located in a circumferential position corresponding to the ball sockets 15 and act as a ball cage for balls 12, which have a diameter exceeding the wall thickness of the sleeve 11. Finally, both sleeves 13, 14 are provided with stops which limit their change in position under the action of the springs 16, 19. In the case of the inner sleeve 13, they are formed by the edge flange 17, which is arranged on the open side and cooperates with the shoulder 18. In the case of the outer sleeve 14, they are formed either by a retaining ring, as in the case of FIG. 8, or likewise by an edge flange in the middle sleeve 11, as in the case of FIGS. 9 through 11. The position of the stops is adjusted to the length of the pin 20, and the positions of the circular groove 21, of the ball sockets 15, and of the balls 12 are adjusted such that the balls are pressed by the outer ring 14 in the inward direction in the stop position and they are pressed by the inner ring in the outward direction in the stop position.

Figure 9:
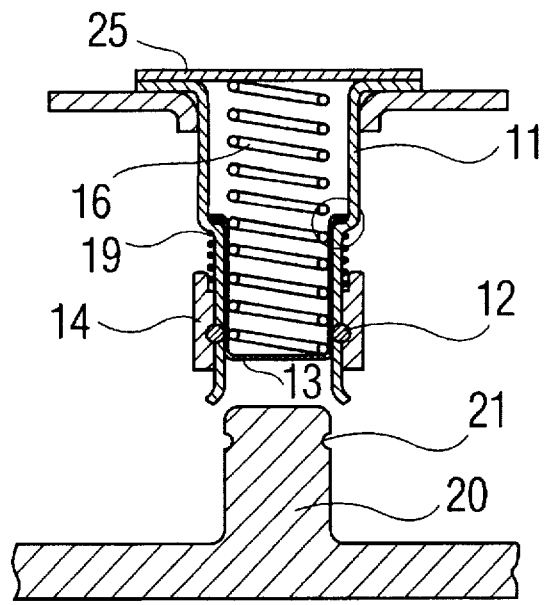
FIG. 9 is a section corresponding to FIG. 8 through a fastening point before mounting.
Figure 10:
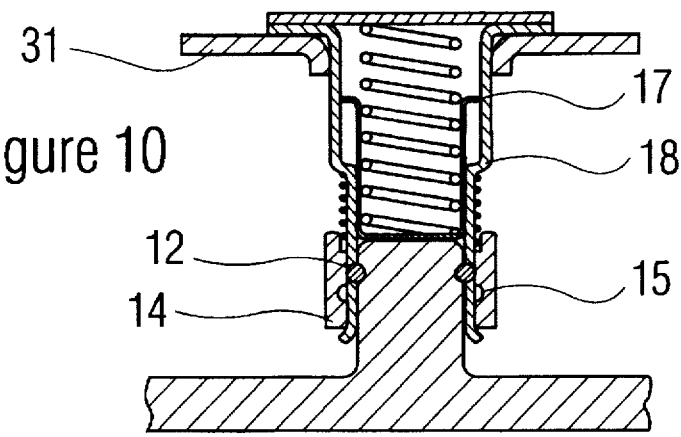
FIG. 10 is a view corresponding to FIG. 9 through a fastening point in an intermediate mounting position.
Figure 11:
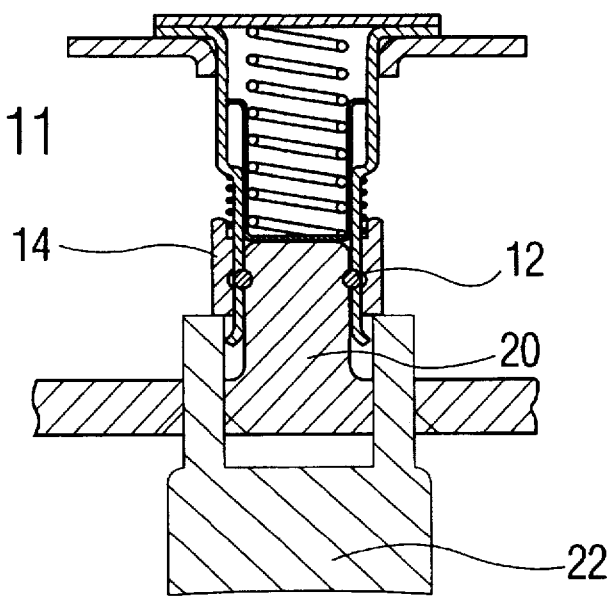
FIG. 11 is a schematic view of the removal process.
Figure 12:
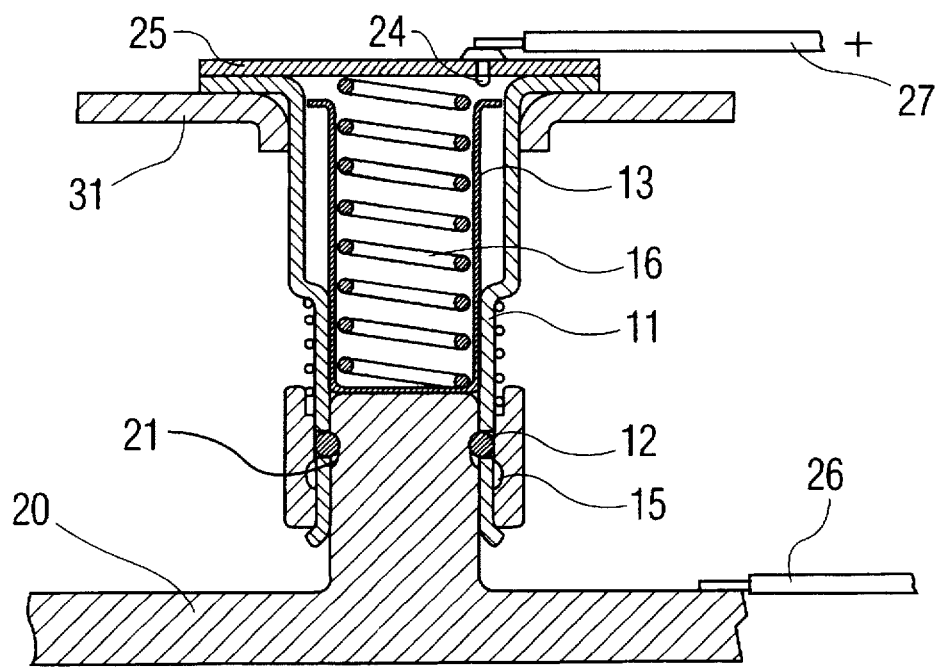
FIG. 12 is a section corresponding to FIG. 8 through a fastening point with signal contact terminal.

In the unmounted state, the device has the position shown in FIG. 9, in which the inner sleeve 13 is held pushed into the middle sleeve 11 to the stop of the flange 17 at the shoulder 18 under the action of the spring 16. The outer sleeve 14 is retracted under the action of the spring 19 to the extent that the balls 12, which are held in the holes of the middle sleeve 11 and are pressed in the outward direction by the inner sleeve 13, engage the ball sockets 15. For mounting, the housing with the sleeves 11 is pushed over the pins 20, while the inner sleeve 13 is displaced after it has been placed on the pin 20. As soon as the groove 21 reaches the area of the balls 12 during the course of its movement, the balls are pressed in the inward direction into the groove by the sleeve 14 loaded by the spring 19. The outer sleeve 14 is displaced, limited by the stop, to the extent that the balls 12 will come to lie outside the ball sockets and are held by the ring in the groove 21. The air bag is then firmly locked on the pin 20 under the action of the spring 16, which causes the necessary compensation of play. The air bag can be loosened only by means of a special tool 22, as shown in FIG. 11, such that the outer ring 14 is lifted by means of the tool 22 to the extent that the balls 12 can again yield into the ball sockets 15 under the action of the pin 20 during the lifting of the air bag.

To compensate for play that may possibly arise between the housing 1 and the steering wheel skeleton due to manufacturing tolerances (FIG. 13), a spring element 23 is provided.

Figure 14:
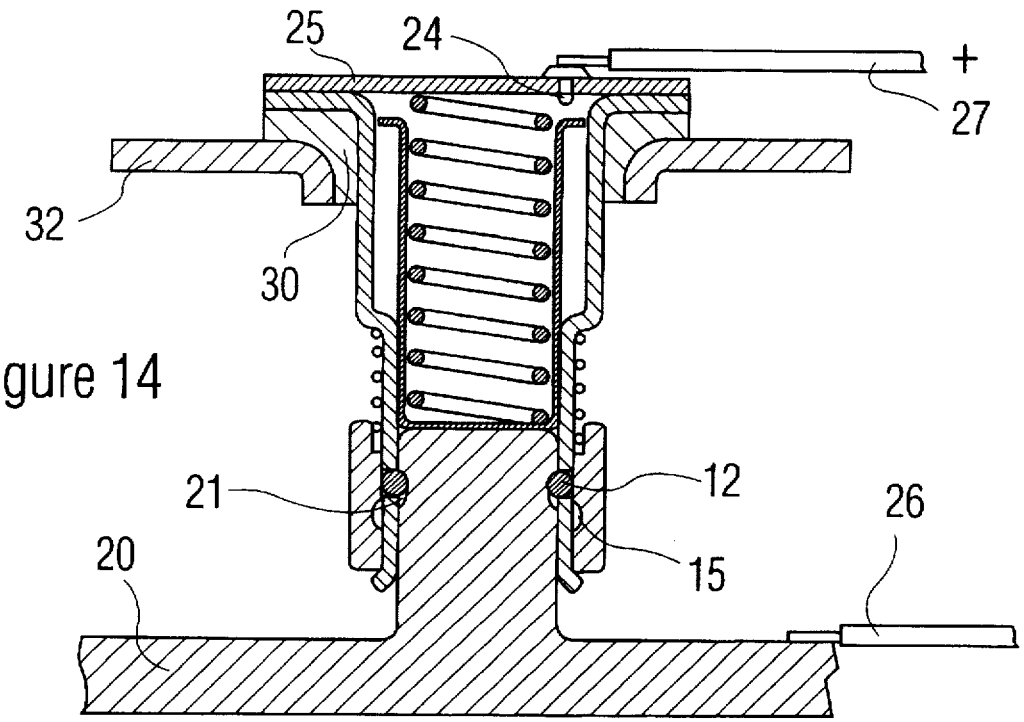
FIG. 14 is another embodiment of the contact means shown in FIG. 12.

The fastening device is also used at the same time to make contact for, e.g., the horn, as well as to transmit power during the contacting. In the case of the device according to FIGS. 9 through 11 (see FIGS. 12 and 14), the spring plate 25, which consists of an insulating material, is used as a support for the contact 24 leading to the power source 27. The middle sleeve 11, which includes a conductive material for this purpose, acts as a countercontact. Finally, the middle sleeve 11 acts, together with the pin 20, as a conductor leading to the ground or the negative pole 26 of the circuit. Furthermore, the groove 21 used to guide the balls 12 has such a height that it leaves an axial range of movement corresponding to the distance between the contact 24 and the sleeve 13 for the balls.

In normal operation, the entire device—including the generator support, which no longer has any rigid connection to the steering wheel or another fixed element, compared with the prior-art modules—is held by the springs 16 in the position shown with open contact 24-13. The contacting is brought about by a pressure on the housing 1 of the module, which is thus pressed downward against the action of the springs 16 until the contact 24-13 is made, including the middle sleeve 11 and the balls 12, which are able to yield in the circumference of the axial range available in the groove 21. The groove is also used at the same time to limit the axial movement. After the pressure is relieved, the device is returned by the springs 16 into its starting position.

Figure 13:
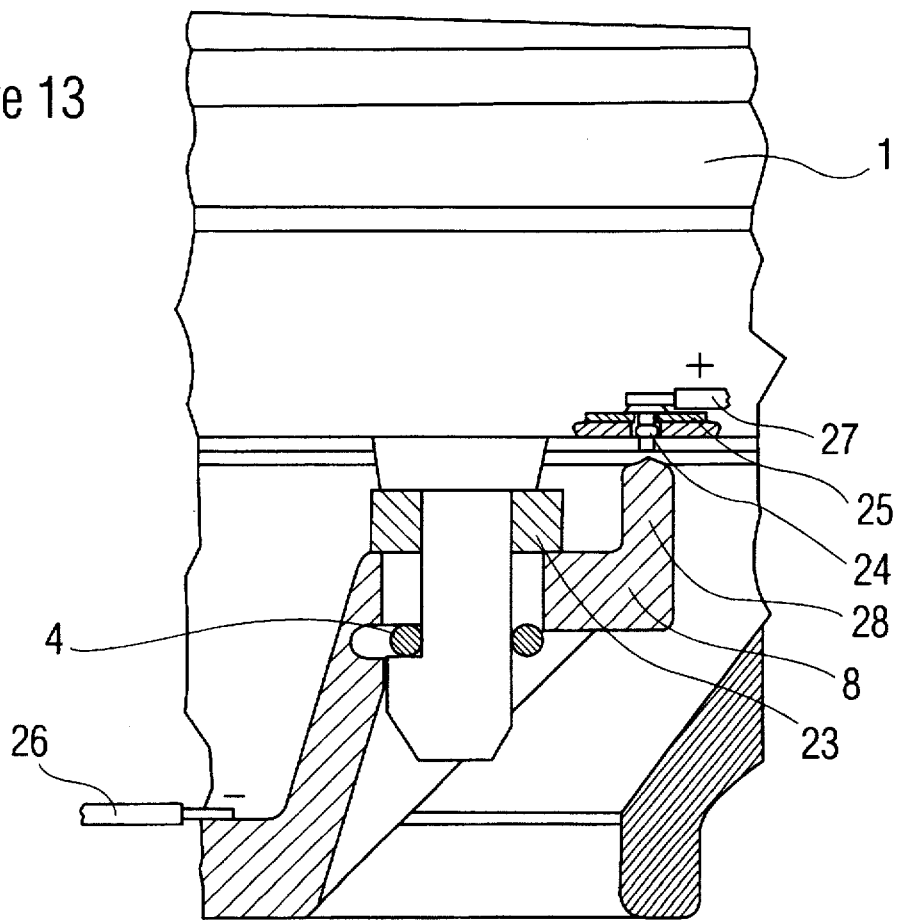
FIG. 13 is an enlarged partial section through the fastening point shown in FIG. 5 with signal contact terminal.
Figure 15:
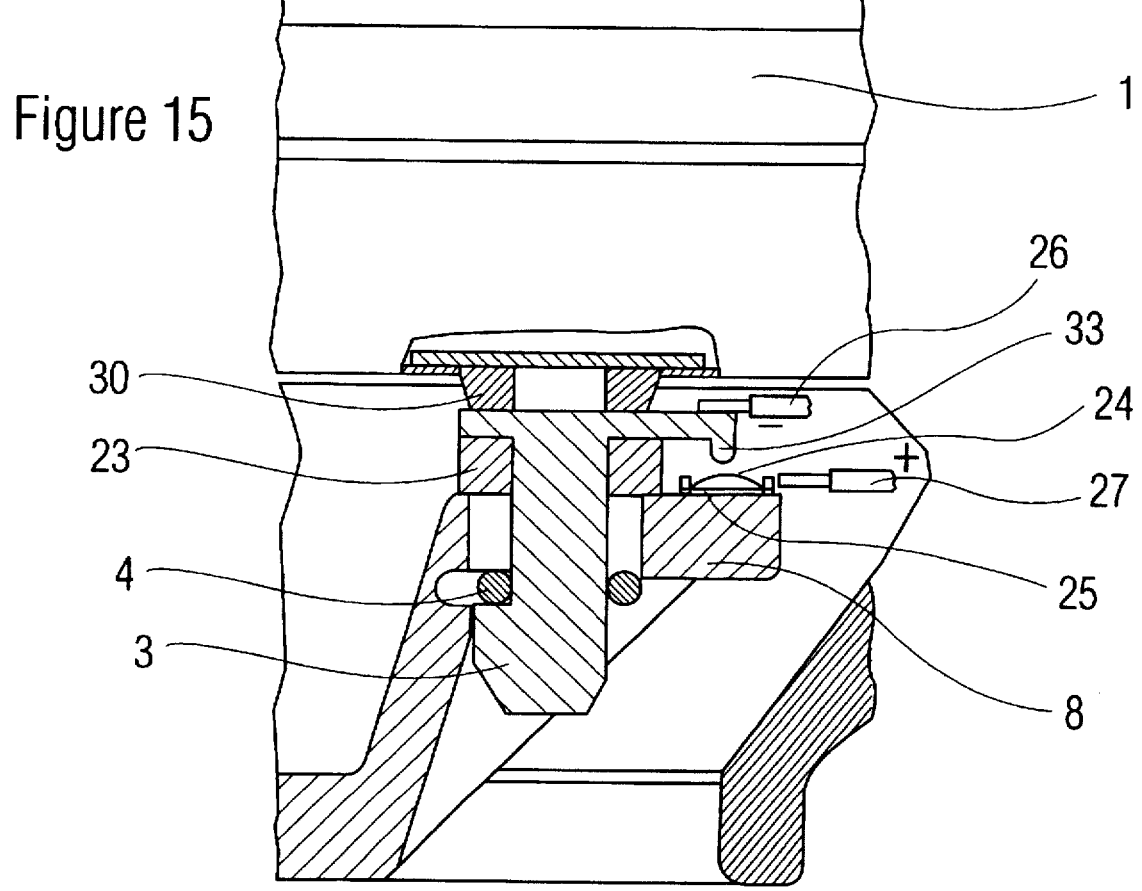
FIG. 15 is another embodiment of the contact means shown in FIG. 14.

Corresponding devices for the embodiments shown in FIGS. 1 through 5 are shown in FIGS. 13 and 15. In the case of the embodiment shown in FIG. 13, the contact 24 of the signal device, which is connected to the power source 27, is fastened in the bottom of the housing 1, and the bracket 8 for the hook 3, which bracket acts as a ground contact 26 or conductor, is provided with a countercontact tappet 28. The housing 1 is at the same time supported against the bracket 8 by means of a spring element 23, which is used at the same time to compensate the play and to maintain the contact distance. The contact is made in this case due to the elasticity of this element upon pressure on the air bag housing.

Another embodiment is shown in FIG. 15, in which—in a more or less reversed arrangement—the contact 24 of the signal device, which contact is connected to the power source 27, is connected to the bracket 8. A ground contact 26 is connected to a tappet 33 attached to the hook 3, which tappet forms the countercontact for the contact 24. The contact is made due to the elasticity of this element upon pressure on the air bag housing in this case as well.

The elastic elements contained in the module act at the same time in terms of a vibration decoupling, i.e., they are used to reduce the reactions of the rotary impulses inevitable in road traffic to the steering wheel. These reactions are greatly intensified due to the high self weight of the air bag module in the case of rigid fastening in the steering wheel by means of the generator support. The decoupling can be further improved by supporting the housing 1 and consequently the entire module by means of an additional elastic element 30 against its respective support 32 or 8, as in the case of the embodiments shown in FIGS. 14 and 15. Since the overall center of gravity of the module is located practically in the plane of the generator support, and because of the high percentage of the weight of the gas generator relative to the total weight of the air bag, and since the generator follows sudden rotary impulses only sluggishly, i.e., with a time delay, due to its inertia of masses, the decoupling placed in this plane also absorbingly counteracts the development of rotary vibrations in the steering wheel as a consequence of such shocks of the steering at the same time.

While specific embodiments of the invention have been shown and described in detail to illustrate the application of the principles of the invention, it will be understood that the invention may be embodied otherwise without departing from such principles.

We claim:

1. A fastening device in combination with an air bag housing and a steering wheel, the combination comprising:

an air bag housing with a housing bottom and a housing cover attached to said housing bottom;

a steering wheel;

a locking member arranged on one of said housing bottom and the steering wheel, said locking member including a pin comprising a circular groove and fastened to a skeleton of the steering wheel;

a spring-tensioned catch engaging said locking member for mounting the air bag housing in the steering wheel, said spring tensioned catch being arranged at the other of said housing bottom and the steering wheel, said spring-tensioned catch including a middle sleeve attachable to said pin, said middle sleeve including an inner and outer shoulder, said middle sleeve being fastened to said bottom housing, said middle sleeve comprising a plurality of holes formed as ball cages;

a plurality of balls positioned in said holes, said plurality of balls having a diameter greater than a wall thickness of said middle sleeve;

an inner sleeve guided in said middle sleeve, said inner sleeve including a stop defining a stop position of said inner sleeve with respect to said middle sleeve, said inner sleeve pressing said balls outward in said stop position;

an outer sleeve guided on said middle sleeve, said outer sleeve including a stop defining a stop position of said outer sleeve with respect to said middle sleeve, said outer sleeve pressing said balls inward in said stop position, said outer sleeve having dome-shaped recesses arranged on a circumferential line of said outer sleeve corresponding to said holes in said middle sleeve;

an inner spring supported on said bottom housing and biases said inner sleeve in said stop position of said inner sleeve; and an outer spring supported on said outer shoulder and biases said outer sleeve in said stop position of said outer sleeve, said outer spring acts on said outer sleeve in a same direction as said inner spring.

2. Device in accordance with claim 1, wherein:

said inner sleeve is designed as a pot-shaped sleeve and said stop of said inner sleeve is an edge flange positioned on an open side of said pot-shaped sleeve, said edge flange contacts said shoulder for travel limitation.

3. Device in accordance with claim 1, wherein:

a signal device is included with said locking member and said spring-tensioned catch, said locking member and said spring-tensioned catch act as contacts for said signal device as well as for transmitting power during contacting.

4. Device in accordance with claim 1, wherein:

a signal device is included with said locking member and said spring-tensioned catch, said locking member and said spring-tensioned catch act as contacts for said signal device as well as for transmitting power during contacting;

a spring plate is a support for one of said contacts of said signal device, one of said contacts being connected to a power source, said middle sleeve being formed of a conductive material and acts as a counter contact to said one contact, said spring plate being isolated from said one contact in a fastening area.

5. Device in accordance with claim 4, wherein:

said middle sleeve is connected to said bottom housing by means of an insulating, elastic element.

6. Device in accordance with claim 1, wherein:

a spring plate is a support for a contact of a signal device, said contact being connected to a power source;

said middle sleeve is formed of a conductive material and acts as a counter contact to said contact, said middle sleeve together with said pin act as a conductor leading to a negative pole of said signal device;

said groove of said pin acts as a guide for said balls and has a height for axial movement of said inner sleeve into and out of contact with said contact while said balls are still in said groove.

* * * * *